United States Patent
Krzyzanowski et al.

(10) Patent No.: US 8,755,309 B2
(45) Date of Patent: Jun. 17, 2014

(54) SYSTEM AND METHOD FOR INTER-PROCESSOR COMMUNICATION

(75) Inventors: Paul Krzyzanowski, Flemington, NJ (US); Mark Grosberg, Boca Raton, FL (US); Eoin Hyden, Atherton (AU)

(73) Assignee: id8 Group R2 Studios, Inc., Redmond, WA (US)

(*) Notice: Subject to any disclaimer, the term of this patent is extended or adjusted under 35 U.S.C. 154(b) by 1215 days.

(21) Appl. No.: 12/239,269

(22) Filed: Sep. 26, 2008

(65) Prior Publication Data

US 2009/0116475 A1 May 7, 2009

Related U.S. Application Data

(60) Provisional application No. 60/976,833, filed on Oct. 2, 2007.

(51) Int. Cl.
*H04L 12/28* (2006.01)

(52) U.S. Cl.
USPC .......................................................... 370/257

(58) Field of Classification Search
None
See application file for complete search history.

(56) References Cited

U.S. PATENT DOCUMENTS

| 4,177,514 | A | | 12/1979 | Rupp |
| 4,757,525 | A | | 7/1988 | Matthews et al. |
| 5,023,778 | A | * | 6/1991 | Simon et al. .................. 709/209 |
| 6,046,823 | A | | 4/2000 | Chen |
| 6,535,018 | B1 | | 3/2003 | Kost |
| 6,763,017 | B1 | * | 7/2004 | Buckingham et al. ........ 370/352 |
| 2003/0156603 | A1 | * | 8/2003 | Rakib et al. .................. 370/485 |
| 2003/0202523 | A1 | * | 10/2003 | Buswell et al. ............... 370/401 |
| 2004/0068535 | A1 | * | 4/2004 | Subbiah et al. ............... 709/200 |
| 2004/0263695 | A1 | * | 12/2004 | Castillo ......................... 348/731 |
| 2005/0105717 | A1 | * | 5/2005 | Lawrie ..................... 379/388.01 |
| 2006/0133343 | A1 | * | 6/2006 | Huang ........................... 370/349 |
| 2007/0015516 | A1 | * | 1/2007 | Huotari et al. .............. 455/456.1 |
| 2007/0112962 | A1 | | 5/2007 | Lewontin |
| 2007/0229231 | A1 | * | 10/2007 | Hurwitz et al. ........... 340/310.11 |
| 2008/0232523 | A1 | * | 9/2008 | Ibrahim et al. ................ 375/355 |
| 2010/0042740 | A1 | * | 2/2010 | Bhattacharya ................ 709/231 |
| 2010/0324711 | A1 | * | 12/2010 | Janke et al. ..................... 700/94 |

FOREIGN PATENT DOCUMENTS

| JP | 2000-253094 A | 9/2000 |
| JP | 2007-026033 A | 2/2007 |
| WO | 2004114628 A1 | 12/2004 |
| WO | 2009045904 A1 | 4/2009 |

OTHER PUBLICATIONS

"Connecting the Atmel ARM-based Serial SYnchronous Controller (SSC) to an I2S-compatible serial Bus", 2003.*

(Continued)

*Primary Examiner* — Otis L Thompson, Jr.
*Assistant Examiner* — Jenkey Van
(74) *Attorney, Agent, or Firm* — Micah Goldsmith; Alin Corie; Micky Minhas

(57) ABSTRACT

A means for reliable inter-processor communication in a multi-processor system is described. In accordance with one aspect, a specially-configured serial bus is used as a general-purpose data link between a first processor and a second processor. The serial bus may be an Inter-IC Sound ($I^2S$) bus. In accordance with another aspect, a network interface residing on a second processor is made available to a first processor via a data link established over an $I^2S$ bus. This allows the second processor to be used as a proxy and to support remote configuration and network address traversal.

15 Claims, 8 Drawing Sheets

(56) References Cited

OTHER PUBLICATIONS

International Search Report and Written Opinion for International Appl. No. PCT/US08/77882 dated Dec. 2, 2008, 12 pages.
Philips, "I2S bus specification", XP002603570, Retrieved from <http://www.nxp.com/acrobat_download2/various/I2SBUS.pdf>, Jun. 5, 1996, 7 pages. Accessed Oct. 5, 2010.
Philips,"The I2C-bus specification Version 2.1", Philips Semiconductors. Product Specification, XX, XX, Jan. 1, 2000, pp. 1-46.
Search Report received for EP Patent Application No. 08836345.2, mailed on Nov. 18, 2010,12 pages.
Office Action received for European Application No. 08836345.2, mailed on Aug. 9, 2011, 4 pages.
Final Office Action received for Chinese Patent Application Serial No. 200880116333.3, mailed on Jul. 17, 2012, 4 pages of Chinese Office Action and 4 pages of English translation.
Office Action received for Japanese Patent Application No. 2010-528044, mailed on Sep. 18, 2012, 3 pages of Japanese Office Action and 4 pages of English translation.

\* cited by examiner

SYSTEM AND METHOD FOR INTER-PROCESSOR COMMUNICATION

CROSS-REFERENCE TO RELATED APPLICATIONS

This application claims priority to provisional U.S. Patent Application No. 60/976,833, filed Oct. 2, 2007, the entirety of which is incorporated by reference as if fully set forth herein.

BACKGROUND OF THE INVENTION

1. Field of the Invention

The invention generally relates to multi-processor systems, including but not limited to dual-processor systems.

2. Background

The use of dual-processor designs to achieve energy efficient, fault-tolerant systems is well known. Dual-processor systems are those that contain two separate physical microprocessors in the same chassis (either on the same board or on separate boards). A dual-processor architecture provides several advantages over a single-processor architecture. For example, in a dual-processor system, both processors can work simultaneously but separately on isolated tasks. Such multi-tasking computer power is crucial in processor-intensive applications such as creating, editing and rendering graphics and multimedia files.

In a telecommunication system, such as a Voice over Internet Protocol (VoIP) telephone, a dual-processing architecture may be implemented to minimize latency and jitter in voice communication. An example dual-processor architecture may include a primary central processing unit (CPU) that is configured to handle traditional operating system (OS) and computational tasks and a digital signal processor (DSP) that is configured to process audio signal data. However, in order for two disparate, separated and/or isolated processors to work together cooperatively, a reliable means for the processors to communicate with each other must be provided.

BRIEF SUMMARY OF THE INVENTION

The present invention provides a reliable means for interprocessor communication in a multi-processor system. In accordance with one aspect of the present invention, a specially-configured serial bus is used as a general-purpose data link between a first processor and a second processor. The serial bus may be an Inter-IC Sound ($I^2S$) bus. In accordance with another aspect of the present invention, a network interface residing on a second processor is made available to a first processor via a data link established over an $I^2S$ bus. This allows the second processor to be used as a proxy and to support remote configuration and network address traversal.

In particular, a method is described herein for facilitating communication between a first processor and a second processor. In accordance with the method, a continuous serial clock signal is transmitted from the first processor to the second processor. A first plurality of frames is transmitted from the first processor to the second processor during the transmission of the continuous serial clock signal, wherein the first plurality of frames includes at least one data frame. Transmitting the continuous serial clock signal may comprise transmitting the continuous serial clock signal over a serial clock signal line of an Inter-IC Sound ($I^2S$) bus, and transmitting the first plurality of frames may comprise transmitting the first plurality of frames over a first serial data line of the $I^2S$ bus.

The method may further include transmitting a second plurality of frames from the second processor to the first processor during the transmission of the continuous clock signal, wherein the transmission of each of the second plurality of frames is synchronized with the transmission of each of a respective one of the first plurality of frames. Transmitting the second plurality of frames comprises transmitting the second plurality of frames over a second serial data line of an Inter-IC Sound ($I^2S$) bus.

The method may still further include transmitting a word select signal from the first processor to the second processor, wherein transmitting the first plurality of frames comprises transmitting each of the first plurality of frames in synchronization with the continuous serial clock signal and the word select signal, and wherein transmitting the second plurality of frames comprises transmitting each of the second plurality of frames in synchronization with the continuous serial clock signal and the word select signal.

A multi-processor system is also described herein. The system includes a first processor, a second processor, and a serial bus interface connecting the first processor and the second processor. The first processor is configured to transmit a continuous serial clock signal to the second processor over the serial bus interface and to transmit a first plurality of frames to the second processor over the serial bus interface during the transmission of the continuous serial clock signal. The first plurality of frames includes at least one data frame. The serial bus interface may comprise an $I^2S$ bus.

The second processor may be configured to transmit a second plurality of frames to the first processor during the transmission of the continuous clock signal, wherein the transmission of each of the second plurality of frames is synchronized with the transmission of each of a respective one of the first plurality of frames.

A method is also described herein for using a first processor having access to a network interface as a proxy for a second processor that does not have access to the network interface. In accordance with the method, a data link is established between the first processor and the second processor over an $I^2S$ bus. The network interface is then accessed by the second processor over the data link. Accessing the network interface may comprise configuring the network interface. Configuring the network interface may comprise configuring network address traversal (NAT) functions or configuring a Transmission Control Protocol (TCP)/Internet Protocol (IP) stack.

A multi-processor system is also described herein. The system includes a first processor, a second processor, an $I^2S$ bus connecting the first processor and the second processor, and a network interface connected to the first processor but not connected to the second processor. The second processor is configured to establish a data link with the first processor over the $I^2S$ bus and to access the network interface over the data link. The second processor may be adapted to configure the network interface by configuring network address traversal (NAT) functions or by configuring a Transmission Control Protocol (TCP)/Internet Protocol (IP) stack.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
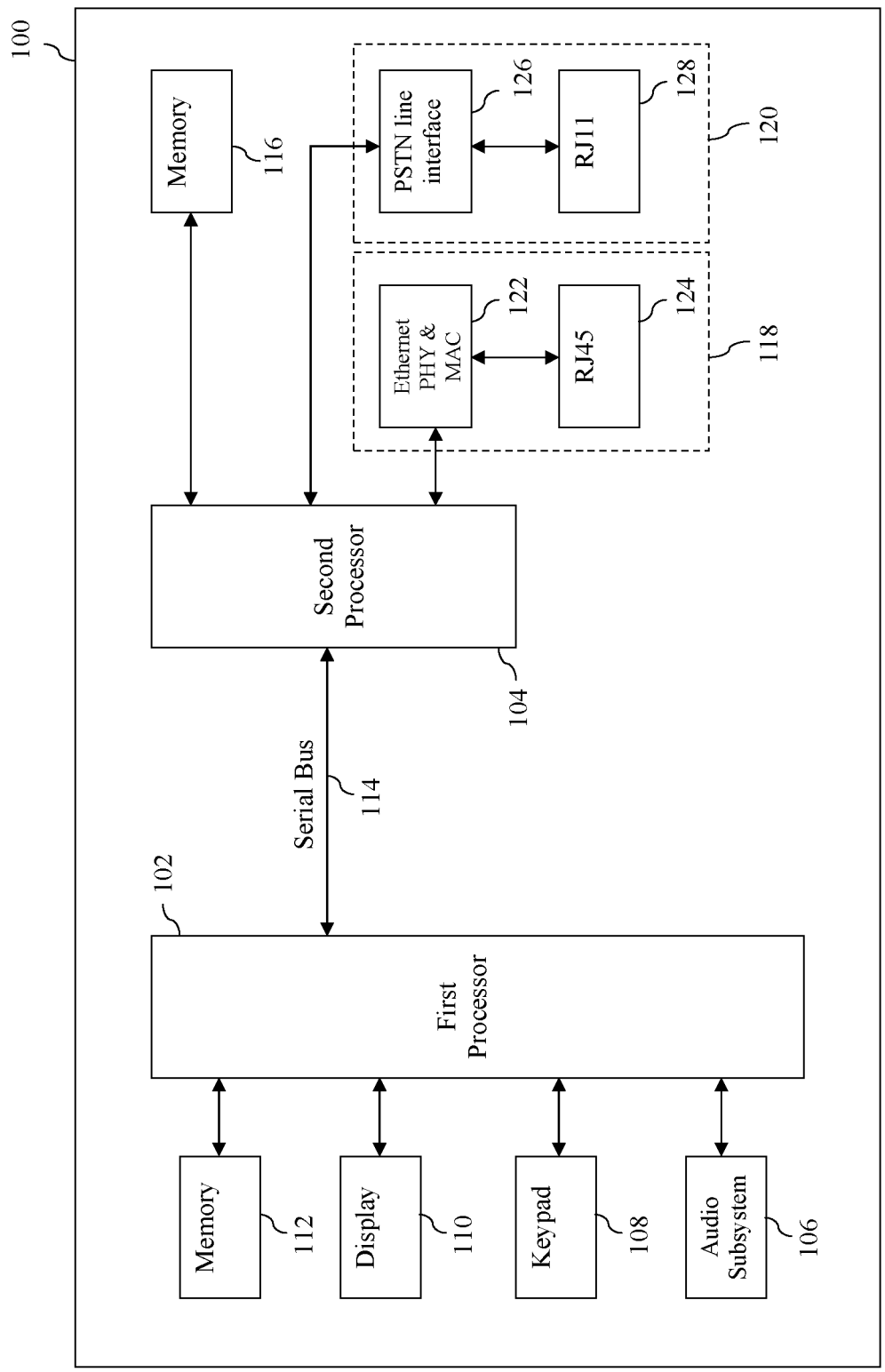
FIG. 1 is a block diagram of a system for a Voice over Internet Protocol (VoIP) telephone that may implement the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Example Operating Environment

FIG. 1 illustrates an example operating environment in which an embodiment of the present invention may operate. In particular, FIG. 1 is a block diagram of a system 100 for a VoIP telephone that may implement the present invention. System 100 utilizes a dual-processor architecture. Specifically, system 100 includes a first processor 102 configured to handle traditional operating system (OS) and computational tasks and a second processor 104 configured to process audio signal data. In one embodiment, first processor 102 is an MCIMX31 (i.MX31) multimedia application processor sold by Freescale Semiconductor, Inc. of Austin, Tex. and second processor 104 is an ADSP-BF536 Blackfin® embedded processor sold by Analog Device, Inc. of Norwood, Mass. In system 100 of FIG. 1, first processor 102 is configured to serve as a Linux-based central processing unit (CPU) while second processor 104 operates as a digital signal processor (DSP).

As shown in FIG. 1, first processor 102 is connected to a memory 112 that stores program instructions for execution by first processor 102 as well as data used or generated during the execution of such instructions. Likewise, second processor 104 is connected to a memory 116 that stores program instructions for execution by second processor 104 as well as data used or generated during the execution of such instructions. As also shown in FIG. 1, second processor 104 is connected to a network interface 118 that includes an Ethernet PHY and MAC 122 and an RJ45 connection 124 and to an optional POTS (plain old telephone service) interface 120 that includes a PSTN line interface 126 and an RJ11 connection 128.

When system 100 of FIG. 1 is operating as a VoIP speaker phone, an audio subsystem 106 captures voice input from a user via a microphone (not shown in FIG. 1) and converts the voice input into an analog audio signal. Audio subsystem 106 provides the analog audio signal to first processor 102, which converts the analog audio signal to a digital form and then passes the digital audio signal to second processor 104 for compression prior to being sent out to an Internet Protocol (IP) network via network interface 118. Conversely, a compressed audio signal is received by second processor 104 from the IP network via network interface 118. Second processor 104 decompresses the compressed audio signal to produce a digital audio signal and then passes the digital audio signal to first processor 102. First processor 102 converts the digital audio signal to an analog form and then passes the analog audio signal to audio subsystem 106 for playback to the user via a speaker (not shown in FIG. 1).

By providing first processor 102 with access to the analog audio input and output signals, system 100 of FIG. 1 allows first processor 102 to perform certain functions associated with those signals, such as speech recognition or audio signal modification. Also, by connecting first processor 102 directly to audio subsystem 106, system 100 of FIG. 1 allows that processor to use the microphone and speaker of audio subsystem 106 for performing media- or multimedia-related functions such as playing back non-telephony-related audio content. First processor 102 is also configured to perform others functions including but not limited to the presentation of a graphical user interface via a display 110, which may comprise an LCD display, and the processing of user input received via a keypad 108.

In contrast, the primary function of second processor 104 is to compress and decompress an audio signal for respective transmission or reception of the audio signal over an IP network via network interface 118. The compression and decompression function is implemented as a signal processing algorithm by second processor 104 and is computationally intensive. Second processor 104 may also be configured to perform ancillary functions such as voice activity detection, echo cancellation, or other well-known functions related to the transmission or reception of an audio signal over a telephony system.

In order for first processor 102 and second processor 104 to work together in the above-described manner, reliable inter-processor communication must be achieved between first processor 102 and second processor 104. As will be described in more detail below, this reliable inter-processor communication is achieved using a specially-configured link. In particular, in accordance with an embodiment of the present invention, a specially-configured serial bus is 114 used. In one embodiment, the serial bus is a $I^2S$ (Inter-IC sound) bus.

Furthermore, in accordance with an embodiment of the present invention, network interface 118 residing on second processor 104 is made available to first processor 102. In effect, second processor 104 is used as a proxy and supports remote configuration and network address traversal (NAT). This feature will also be described in more detail below.

Although aspects of the present invention are described herein with reference to example system 100 of FIG. 1, the invention is not limited to that operating environment. As will be appreciated by persons skilled in the relevant art(s), the present invention may be utilized in any system that utilizes two or more processors for performing system functions.

B. Use of a Serial Bus as a General-Purpose Data Link in Accordance with an Embodiment of the Present Invention In accordance with an embodiment of the present invention, a specially-configured serial bus is used as a general-purpose data link between a first processor and a second processor. In an embodiment described herein, the serial bus is an $I^2S$ bus, although the invention is not so limited. This aspect of the present invention will now be described in more detail with reference to the example operating environment of FIG. 1, in which first processor 102 is an i.MX31 multimedia application processor and second processor 104 is an ADSP-BF536 Blackfin® embedded processor. However, the invention is not limited to this particular implementation and other processors may be used.

As will be appreciated by persons skilled in the relevant art(s), the $I^2S$ bus is an electrical serial bus interface designed by Philips Semiconductors for connecting digital audio devices (such as compact-disc (CD) players, digital audio tape, digital sound processors and digital TV-sound) together. For example, the $I^2S$ bus can serve as a serial link to carry 2-channel (stereo) Pulse Code Modulation digital data between the CD transport and digital-to-analog (DAC) converter in a CD player. The $I^2S$ bus is described in the $I^2S$ Bus Specification (February 1986), published by Philips Semiconductors, the entirety of which is incorporated by reference as if fully set forth herein.

The $I^2S$ bus is typically used to handle audio data only, while other signals (such as sub-coding and control) are transferred separately. To minimize the number of pins required and to keep wiring simple, the $I^2S$ bus consists of three serial bus lines: a serial data line with two time-division multiplexed data channels, a word select line, and a continuous serial clock line. By separating the data and clock signals, the $I^2S$ bus avoids time-related errors that cause jitter, thereby eliminating the need for anti-jitter devices. Jitter can cause distortion in a DAC.

Both the i.MX31 multimedia application processor and the ADSP-BF536 Blackfin® embedded processor provide at least one interface for connecting to an $I^2S$ bus. In particular, the i.MX31 multimedia application processor provides two Synchronous Serial Interface (SSI)/$I^2S$ interfaces, each of which may be used for connecting to an $I^2S$ bus, while the BF536 Blackfin® embedded processor provides two serial ports, each of which supports $I^2S$ capable operation.

Figure 2:
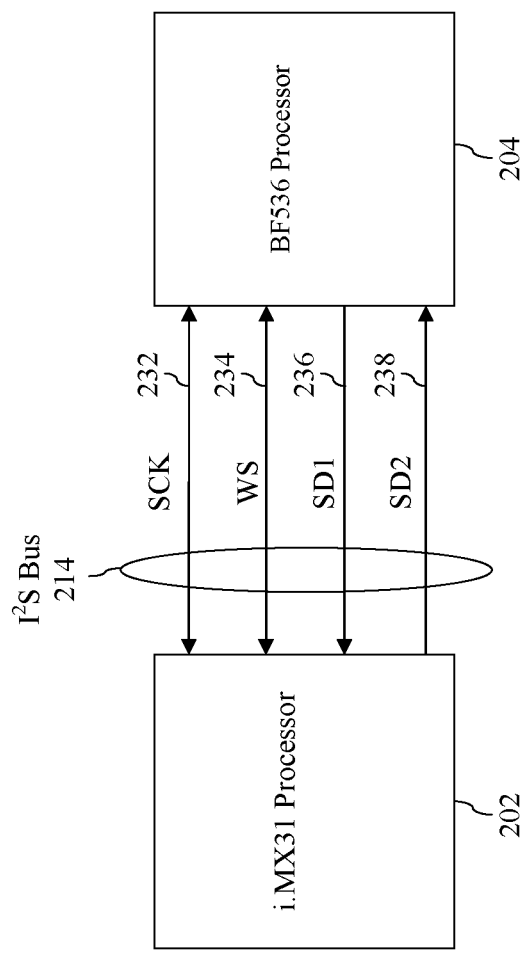
FIG. 2 depicts the connection of a first processor to a second processor using an $I^2S$ bus in accordance with an embodiment of the present invention.

As shown in FIG. 2, in one implementation of system 100 of FIG. 1, an i.MX31 multimedia application processor 202 (also referred to herein as i.MX31 processor 202) and an ADSP-BF536 Blackfin® embedded processor 204 (also referred to herein as BF536 processor 204) are connected to each other over an $I^2S$ bus 206 using a four-wire configuration. In accordance with this four-wire configuration, a first wire 232 is used to carry a continuous serial clock (SCK), a second wire 234 is used to carry a word select signal (WS), a third wire 236 is used for carrying serial data (SD1) from BF536 processor 204 to i.MX31 processor 202 and a fourth wire 238 is used for carrying serial data (SD2) from i.MX31 processor 202 to BF536 processor 204. The direction of transmission of SCK and WS is dependent on which processor is acting as the bus master. The use of the two serial data lines permits concurrent bi-directional transfer of data between the two processors.

BF536 processor 204 is configured to use $I^2S$ bus 214 for both the transfer of audio signals in a traditional manner as well as for the transfer of data signals used for multiprocessor communication. In a mode of operation in which it is transmitting data signals over $I^2S$ bus 214, BF536 processor 204 is configured to stop and restart the serial clock SCK. In contrast, i.MX31 processor 202 is configured to use $I^2S$ bus for the transfer of audio signals only. Consequently, i.MX31 processor 202 is not tolerant of the stopping and restarting of the serial clock SCK by BF536 processor 204. Thus, when $I^2S$ bus 214 is used by i.MX31 processor 202 for transferring data signals, data received over that bus and stored in a first-in first-out (FIFO) buffer of i.MX31 processor 202 may become corrupted.

Ideally one would prefer to send variable length frames between the two processors only when needed. This would save DMA (memory) bandwidth as well as processor cycles. But this is not always achievable. For example, as described above, the stopping of the serial clock SCK during periods in which no data is being transmitted between the two processors may cause i.MX31 processor 202 to lose synchronization and data stored in a FIFO buffer of that processor may be corrupted.

An embodiment of the present invention overcomes this problem by creating and using a continually-running (streaming) protocol that ensures that the serial clock SCK is never stopped. A highly-optimized packet-mode data transport is then layered on top of the $I^2S$ interface.

Figure 3:
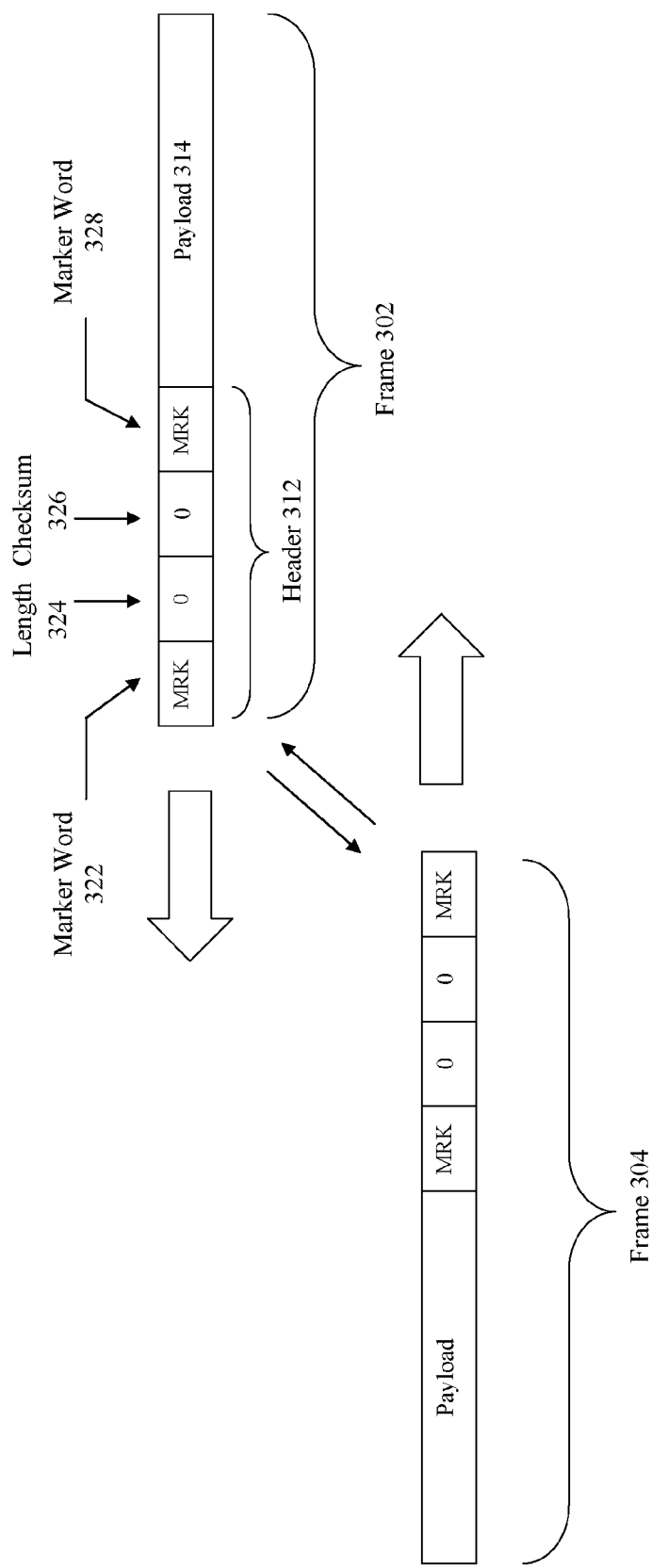
FIG. 3 depicts the simultaneous exchange of fixed-length frames between a first and second processor over an $I^2S$ bus in accordance with an embodiment of the present invention.

The streaming protocol uses fixed-length frames having fixed-length headers. By way of example, FIG. 3 depicts a representative fixed-length frame 302 having a fixed-length header 312 and payload 314. Each fixed-length header identifies the type of the frame (e.g., audio or data), and also includes other information such as a length of the packet carried by the frame and a checksum. These fields are respectively denoted length 324 and checksum 326 in representative header 312. In one embodiment, the checksum is a 16-bit checksum that is placed over the entire data of the frame.

In accordance with the streaming protocol, each endpoint exchanges the fixed-length frames simultaneously. Therefore, as the first word of a frame header is being transmitted by i.MX31 processor 202, the first word of another frame header is also being transmitted by BF536 processor 204. This allows each processor to use the same serial clock SCK and word select WS signal for controlling the transmission of data. By way of illustration, the simultaneous exchange of representative fixed-length frames 302 and 304 is depicted in FIG. 3. In an embodiment of the present invention the WS signal is used to denote the frame boundary. As noted above, each frame is categorized as either an audio frame or a data frame. In one embodiment, data frames are formatted as raw Internet Protocol (IP) datagrams having no media access control (MAC) header.

An embodiment of the present invention also includes a frame synchronization protocol to allow the two processors to synchronize data transmission. This frame synchronization protocol is used during system startup, and also may be used when either processor reboots or in any situation where synchronization has been lost between the two processors for any reason.

In order to facilitate frame synchronization, the header of each frame includes two marker words. This is further illustrated in FIG. 3, which shows that header 312 of representative frame 302 includes a first marker word 322 and a second marker word 328. During frame synchronization, the processor acting as bus master continually clocks out "null" (empty) frames until it detects the boundary of frames transmitted by the other processor. A null frame may be denoted by setting the packet length and checksum associated with the frame to zero. The bus master detects the boundary of frames transmitted by the other processor by searching for the marker pattern of the other processor. Once the boundary of frames transmitted by the other processor is detected, the bus master aligns its frame transmission to that of the other processor. All further configuration then occurs in the Transmission Control Protocol (TCP)/IP layer.

In one embodiment of the present invention, each processor 202 and 204 is configured to receive an out-of-band reset signal to trigger the foregoing synchronization protocol. Because the execution of the synchronization protocol is expensive in terms of time and processor resources, it is not desirable to use the protocol to support the transmission of variable-length frames, although such an implementation is possible.

In accordance with a further embodiment of the present invention, the two processors 202 and 204 communicate via the I²S communications link under a voice prioritization regime. That is, when transmitting frames, a pending voice or audio frame always takes precedence over a pending data frame. This regime is intended to minimize latency and jitter associated with VoIP telephone calls being handled by system 100.

Figure 4:
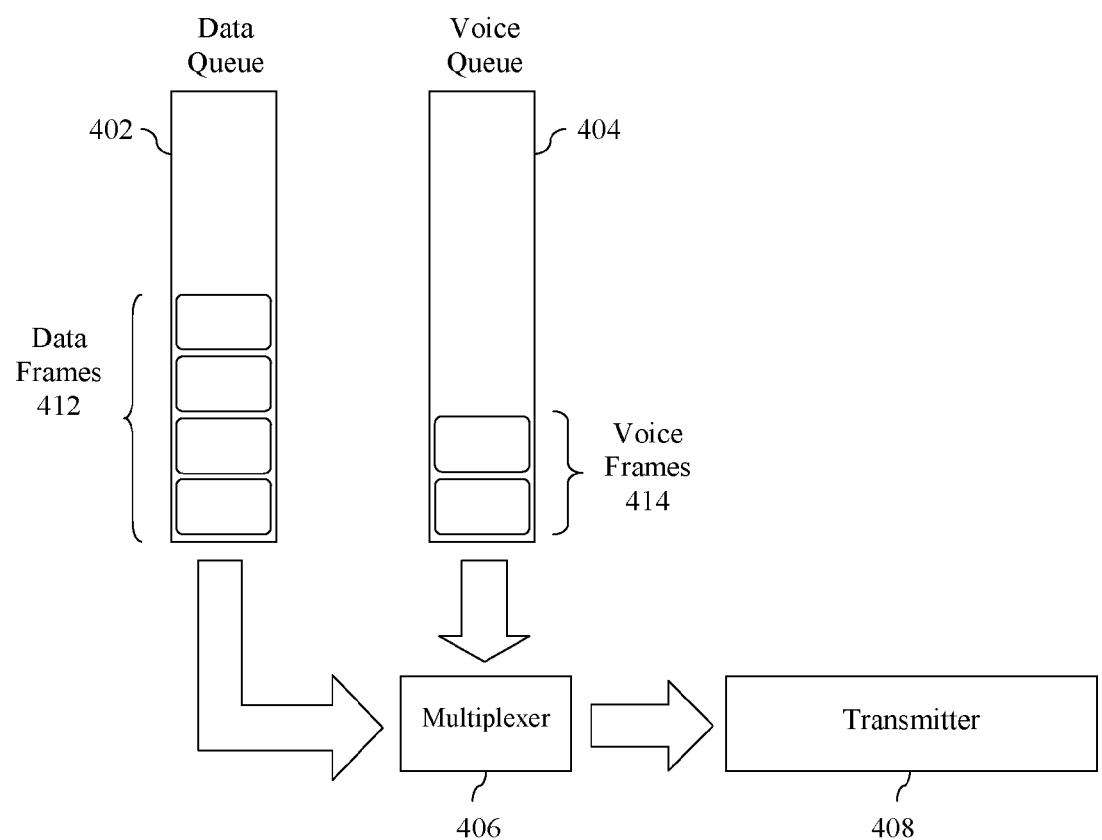
FIG. 4 is a block diagram that depicts components of a first and second processor that are used to implement a voice prioritization scheme for transmitting frames between the two processors in accordance with an embodiment of the present invention.

FIG. 4 is a block diagram that depicts components of each processor 202 and 204 used to implement the voice prioritization scheme. In particular, as shown in FIG. 4, each processor includes a data queue 402 and a voice queue 404 connected via a multiplexer 406 to a transmitter 408. Data queue 402 is configured to hold data frames scheduled for transmission over the I²S communications link, while voice queue 404 is configured to hold voice frames scheduled for transmission over the I²S communications link. For example, as shown in FIG. 4, data queue 402 is holding exemplary data frames 412 and voice queue 404 is holding exemplary voice frames 414. Multiplexer 406 is configured to selectively provide either a data frame from data queue 402 or a voice frame from voice queue 404 to transmitter 408 for transmission over the I²S communications link. Multiplexer 406 is further configured to perform this function by giving voice frames precedence over data frames.

As noted above, in accordance with an embodiment of the present invention, the data frames and voice frames are of a fixed size. In order to ensure that a high-bandwidth TCP/IP link is provided for voice communication, a large frame size may be used to carry voice information. For maximum efficiency, each frame is transmitted using as few memory copies as possible. As noted above, a simple 16-bit checksum is placed over the entire data of the frame in the header. Other than that the protocol does not require any inspection of the payload for the majority of its processing.

Figure 5:
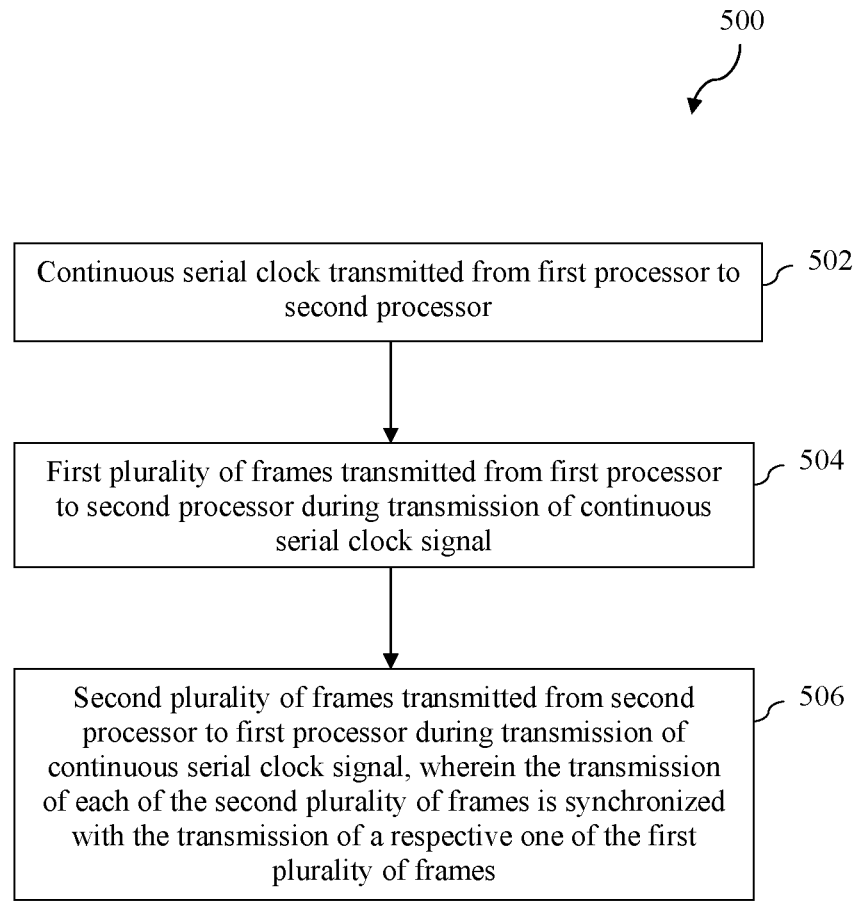
FIG. 5 depicts a flowchart of a method for facilitating communication between a first processor and a second processor in accordance with an embodiment of the present invention.

FIG. 5 depicts a flowchart 500 of a method for facilitating communication between a first processor and a second processor in accordance with the foregoing description. Flowchart 500 will now be described with continued reference to system 100 of FIG. 1. However, the method of flowchart 500 is not limited to that implementation.

As shown in FIG. 5, the method of flowchart 500 begins at step 502, in which a continuous serial clock is transmitted from first processor 102 to second processor 104 over serial bus 114. This step may comprise transmitting the continuous serial clock signal over a serial clock signal line of an I²S bus.

At step 504, a first plurality of frames is transmitted from first processor 102 to second processor 104 over serial bus 114 during the transmission of the continuous serial clock signal. This step may comprise transmitting the first plurality of frames over a first serial data line of an I²S bus. The first plurality of frames may include voice or data frames. Each of the first plurality of frames may comprise a fixed-length frame.

At step 506, a second plurality of frames is transmitted from second processor 104 to first processor 102 over serial bus 114 during the transmission of the continuous clock signal, wherein the transmission of each of the second plurality of frames is synchronized with the transmission of each of a respective one of the first plurality of frames. This step may comprise transmitting the second plurality of frames over a second serial data line of an I²S bus. The second plurality of frames may include voice or data frames. Each of the second plurality of frames may comprise a fixed-length frame.

The foregoing method of flowchart 500 may further include the step of transmitting a word select signal from first processor 102 to second processor 104 over serial bus 114. In such an embodiment, transmitting the first plurality of frames may comprise transmitting each of the first plurality of frames in synchronization with the continuous serial clock signal and the word select signal. Additionally, in such an embodiment, transmitting the second plurality of frames may comprise transmitting each of the second plurality of frames in synchronization with the continuous clock signal and the word select signal. Transmitting the word select signal may include transmitting the word select signal over a word select signal line of an I²S bus.

C. Use of Second Processor by First Processor as Network Proxy in Accordance with an Embodiment of the Present Invention Network-capable consumer electronics devices that incorporate multiple processors often have only a single network interface (e.g., an Ethernet or Wi-Fi interface) that is accessible by only one processor. It would be beneficial if all the processors in the multi-processor system could use that single network interface. In particular, it would be beneficial if the single processor having network access could act as a proxy to support remote configuration and network address traversal.

As described above, in one embodiment of the present invention, a serial bus, such as an I²S bus, serves as a high-speed, large bandwidth, general-purpose data link between a first processor (which may be, for example a general purpose CPU) and a second processor (which may be, for example, an external/remote DSP), providing reliable data transfer between the two processors. In accordance with another aspect of the present invention, the serial bus can also be used to enable each processor in a multi-processor system to access a network, such as an Ethernet or Wi-Fi network, without having to resort to the use of internal switches or multiple transceivers.

For example, in system 100 described above in reference to FIG. 1, network interface 118 resides on second processor 104. In accordance with an embodiment of the present invention, first processor 102 is adapted to configure and use network interface 118 on remote processor 104 via serial bus 114. An example of such an embodiment is depicted in FIG. 6, wherein first processor 102 is implemented as an i.MX31 multimedia application processor 602 (also referred to herein as i.MX31 processor 602), second processor 104 is implemented as an ADSP-BF536 Blackfin® embedded processor 604 (also referred to herein as BF536 processor 604) and serial bus 114 is implemented as an I²S bus 606.

Figure 6:
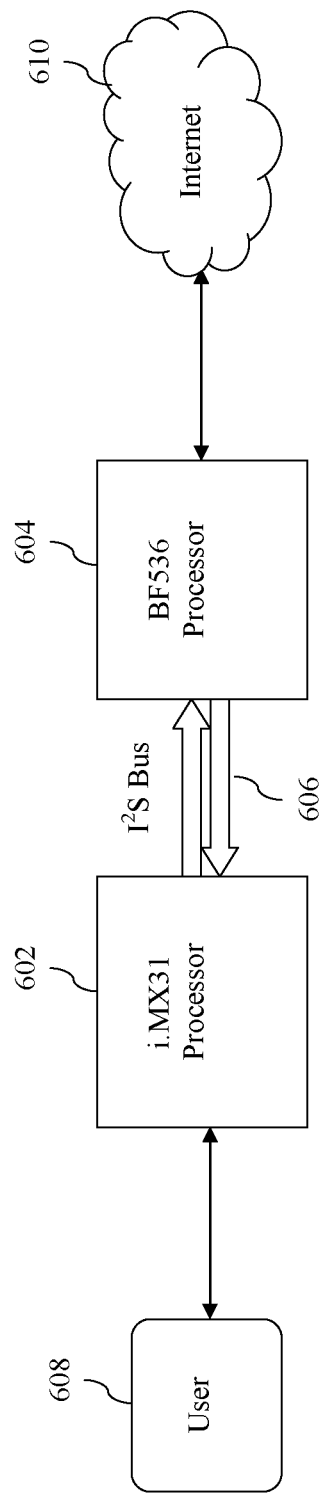
FIG. 6 is a block diagram that depicts the use of a second processor by a first processor as a network proxy in accordance with an embodiment of the present invention.

With reference to the embodiment depicted in FIG. 6, a protocol is employed to allow i.MX31 processor 602 to configure BF536 processor 604. This protocol is layered atop I²S bus 606 and is used to configure other protocols on the interprocessor data link, including configuration of the NAT (network address traversal) and TCP/IP stack as well as other functions resident on BF536 processor 604. Such other functions may include but are not limited to voice-engine configuration, Public Switched Telephone Network (PSTN) telephony, system heartbeat, and other miscellaneous tasks.

Figure 7:
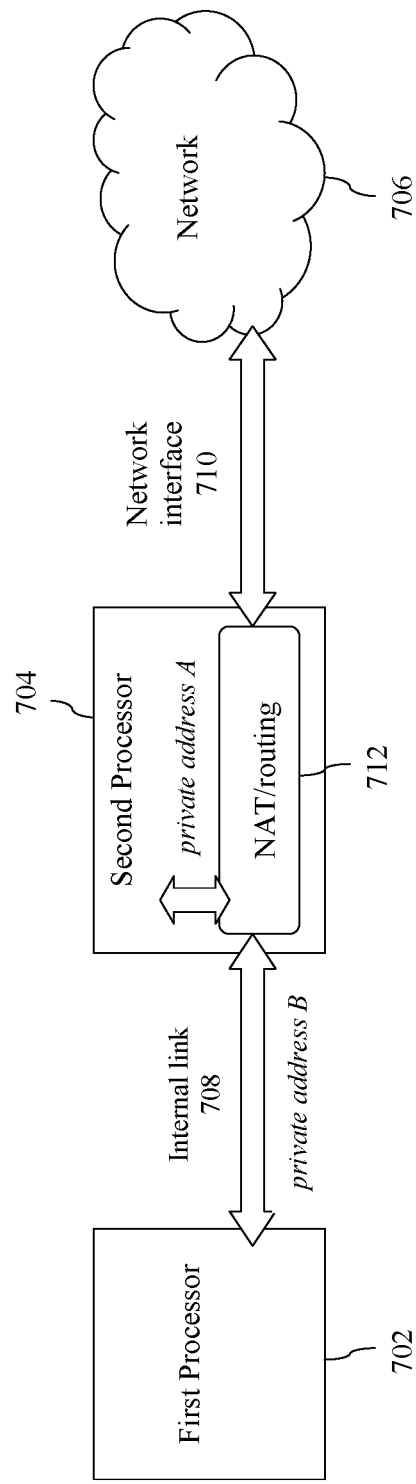
FIG. 7 is another block diagram that depicts the use of a second processor by a first processor as a network proxy in accordance with an embodiment of the present invention.

This concept is further illustrated in FIG. 7. In particular, FIG. 7 depicts a multiprocessor system 700 in accordance with an embodiment of the present invention in which a first processor 702 is connected to a second processor 704 via an internal link 708. First processor 702 is able to configure NAT/routing logic 712 within second processor 704 using a protocol layered atop of a serial bus interface, such as an I²S interface, implemented over internal link 708. Such configuration of NAT/routing logic 712 may include the assignment of a first private IP address (denoted "private address B" in FIG. 6) to first processor 702 and the assignment of a second private IP address (denoted "private address A") to second processor 704. Such private IP addresses may be used by NAT/routing logic 712 in a well-known manner to manage communication between each of the two processors and entities residing on a network 706, wherein such communication is carried out over a single network interface 710.

The use of such a protocol is particularly relevant to the extent that second processor 704 acts as a network router. In such a case, it is necessary to provide network configuration data to second processor 704. In accordance with this embodiment, internal link 708 is used to pass fixed IP addresses and TCP/IP is used to establish further TCP/IP connectivity.

Figure 8:
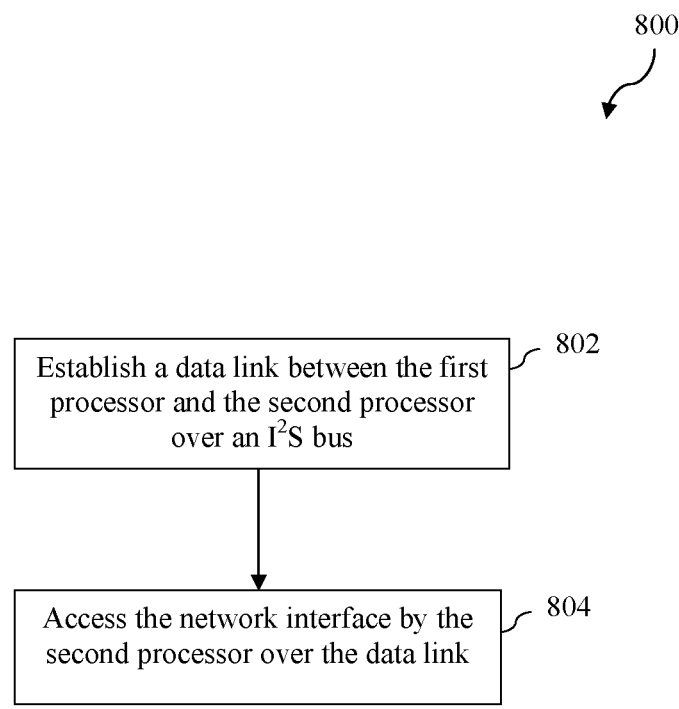
FIG. 8 depicts a flowchart of a method for using a first processor having access to a network interface as a proxy for a second processor that does not have access to the network interface in accordance with an embodiment of the present invention.

FIG. 8 depicts a flowchart 800 of a method for using a first processor having access to a network interface as a proxy for a second processor that does not have access to the network interface in accordance with the foregoing description. As shown in FIG. 8, the method of flowchart 800 begins at step 802, in which a data link is established between the first processor and the second processor over an I²S bus. At step 804, the network interface is then accessed by the second processor over the data link. In an embodiment, accessing the network interface comprises configuring the network interface. Configuring the network interface may comprise, for example, configuring NAT functions or configuring a TCP/IP stack.

D. Conclusion

While various embodiments of the present invention have been described above, it should be understood that they have been presented by way of example only, and not limitation. For example, although aspects of the present invention have been described above in reference to the dual-processor architecture of system 100 of FIG. 1, the invention is not limited to that operating environment. Rather, embodiments of the present invention may be implemented in any system that utilizes a multi-processor architecture.

Furthermore, it will be understood by those skilled in the relevant art(s) that various changes in form and details may be made to the embodiments of the present invention described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for facilitating communication between a first microprocessor and a second microprocessor in a multi-processor device using a serial bus, the serial bus comprising at least a serial clock signal line, a first serial data line and a second serial data line, comprising:

transmitting a continuous serial clock signal from the first microprocessor to the second microprocessor over the serial clock signal line;

transmitting a first plurality of words from the first microprocessor to the second microprocessor over the first serial data line during the transmission of the continuous serial clock signal, wherein the first plurality of words are transmitted in a first plurality of frames, the first plurality of frames including at least one data frame; and transmitting a second plurality of frames from the second microprocessor to the first microprocessor over the second serial data line during the transmission of the continuous clock signal, wherein the transmission of each of the second plurality of frames is synchronized with the transmission of each of a respective one of the first plurality of frames, wherein a marker word in a header of at least one frame transmitted from the first microprocessor to the second microprocessor is detected and the transmission of the second plurality of frames is synchronized based on the detected marker word, and wherein the first microprocessor transmits a word select signal to the second microprocessor and transmits each of the first plurality of frames in synchronization with the continuous serial clock signal and the word select signal, and wherein the second plurality of frames is transmitted in synchronization with the continuous serial clock signal and the word select signal.

2. The method of claim 1,
wherein transmitting the continuous serial clock signal over the serial clock signal line comprises transmitting the continuous serial clock signal over a serial clock signal line of an Inter-IC Sound (I2S) bus, and
wherein the first plurality of frames is transmitted over a first serial data line of the I2S bus.

3. The method of claim 1, wherein each of the first plurality of frames is a fixed-length frame.

4. The method of claim 1, wherein transmitting the second plurality of frames over the second serial data line comprises transmitting the second plurality of frames over a second serial data line of an Inter-IC Sound (I2S) bus.

5. The method of claim 1, wherein the serial bus comprises an Inter-IC Sound (I2S) bus, and transmitting the word select signal comprises transmitting the word select signal over a word select signal line of the I2S bus.

6. The method of claim 1, further comprising:
storing a data frame scheduled for transmission to the second microprocessor in a first queue;
storing a voice frame scheduled for transmission to the second microprocessor in a second queue; and
transmitting the voice frame to the second microprocessor prior to the data frame in accordance with a voice prioritization scheme.

7. A multi-processor system, comprising:
a first microprocessor;
a second microprocessor; and
a serial bus interface connecting the first microprocessor and the second microprocessor, the serial bus interface comprising at least a serial clock signal line, a first serial data line and a second serial data line;
wherein the first microprocessor is configured to transmit a continuous serial clock signal to the second microprocessor over the serial clock signal line and to transmit a first plurality of frames to the second microprocessor over the first serial data line during the transmission of the continuous serial clock signal, wherein the first plurality of frames includes at least one data frame, wherein the second microprocessor is configured to transmit a second plurality of frames to the first microprocessor over the second serial data line during the transmission of the continuous clock signal, wherein the transmission of each of the second plurality of frames is synchronized with the transmission of each of a respective one of the first plurality of frames, wherein a marker word in a header of at least one frame transmitted from the first microprocessor to the second microprocessor is detected and the transmission of the second plurality of frames is synchronized based on the detected marker word, and wherein the first microprocessor transmits a word select signal to the second microprocessor and transmits each of the first plurality of frames in synchronization with the continuous serial clock signal and the word select signal, and wherein the second plurality of frames is transmitted in synchronization with the continuous serial clock signal and the word select signal.

8. The system of claim 7, wherein the serial bus interface comprises an Inter-IC Sound (I2S) bus, and wherein the first microprocessor is configured to transmit the continuous serial clock signal over a serial clock signal line of the I2S bus, and to transmit the first plurality of frames over a first serial data line of the I2S bus.

9. The system of claim 8, wherein the second microprocessor is configured to transmit the second plurality of frames over a second serial data line of the I2S bus.

10. The system of claim 7, wherein each of the first plurality of frames is a fixed-length frame.

11. The system of claim 7, wherein the serial bus interface comprises an Inter-IC Sound (I2S) bus, and wherein the first microprocessor is configured to transmit the word select signal over a word select signal line of the I2S bus.

12. The system of claim 7, wherein the first microprocessor is further configured to store a data frame scheduled for transmission to the second microprocessor in a first queue, to store a voice frame scheduled for transmission to the second microprocessor in a second queue, and to transmit the voice frame to the second microprocessor prior to the data frame based on a voice prioritization scheme.

13. A method for using a first microprocessor having access to a network interface as a proxy for a second microprocessor that does not have access to the network interface in a multi-processor device, comprising:

establishing a data link between the first microprocessor and the second microprocessor over an Inter-IC Sound (I2S) bus comprising a serial clock line, a first serial data line and a second serial data line, establishing the data link comprising:

transmitting a continuous serial clock signal from the first microprocessor to the second microprocessor over the serial clock signal line;

transmitting a first plurality of frames from the first microprocessor to the second microprocessor over the first serial data line during the transmission of the continuous serial clock signal; and transmitting a second plurality of frames from the second microprocessor to the first microprocessor over the second serial data line during the transmission of the continuous clock signal; and accessing and configuring the network interface by the second microprocessor over the data link, configuring the network interface including at least one of configuring network address traversal (NAT) functions and configuring a Transmission Control Protocol (TCP)/Internet Protocol (IP) stack.

14. The method of claim 13, wherein the network interface is included in the first microprocessor and configuring the network interface comprises configuring the first microprocessor.

15. A multi-processor device, comprising:

a first microprocessor;

a second microprocessor;

an Inter-IC Sound (I2S) bus connecting the first microprocessor and the second microprocessor, the I2S bus comprising a serial clock line, a first serial data line and a second serial data line; and a network interface connected to the first microprocessor but not connected to the second microprocessor;

wherein the second microprocessor is configured to establish a data link with the first microprocessor over the I2S bus and to access and configure the network interface over the data link, the establishment of the data link comprising:

transmitting a continuous serial clock signal from the second microprocessor to the first microprocessor over the serial clock signal line;

transmitting a first plurality of frames from the second microprocessor to the first microprocessor over the first serial data line during the transmission of the continuous serial clock signal; and transmitting a second plurality of frames from the first microprocessor to the second microprocessor over the second serial data line during the transmission of the continuous clock signal; and wherein the second microprocessor is configured to configure the network interface by at least one of configuring network address traversal (NAT) functions and configuring a Transmission Control Protocol (TCP)/Internet Protocol (IP) stack.

* * * * *